(12) United States Patent
Sylvester

(10) Patent No.: US 8,491,361 B2
(45) Date of Patent: Jul. 23, 2013

(54) WINDSHIELD WIPER RESURFACING TOOL

(76) Inventor: Michael Sylvester, Massapequa, NY (US)

( * ) Notice: Subject to any disclaimer, the term of this patent is extended or adjusted under 35 U.S.C. 154(b) by 427 days.

(21) Appl. No.: 12/799,620

(22) Filed: Apr. 28, 2010

(65) Prior Publication Data

US 2011/0053477 A1   Mar. 3, 2011

Related U.S. Application Data

(60) Provisional application No. 61/275,549, filed on Aug. 31, 2009.

(51) Int. Cl.
*B24B 7/00* (2006.01)

(52) U.S. Cl.
USPC ............ 451/552; 451/555; 451/319; 451/321

(58) Field of Classification Search
USPC ................. 451/552, 555–558, 319, 312, 321, 451/540; 76/83, 81.1, 81.4
See application file for complete search history.

(56) References Cited

U.S. PATENT DOCUMENTS

| | | | |
|---|---|---|---|
| 3,886,657 A | 6/1975 | Fabian | |
| 4,604,802 A | 8/1986 | Samuelsson | |
| 4,617,765 A * | 10/1986 | Weiler | 451/558 |
| 4,785,699 A | 11/1988 | Oblinger et al. | |
| 5,251,351 A | 10/1993 | Klotz | |
| 5,359,776 A | 11/1994 | Glazer | |
| 5,848,471 A | 12/1998 | Freeland | |
| 6,312,017 B1 * | 11/2001 | Hardwick et al. | 280/825 |
| 6,322,266 B1 | 11/2001 | Traynor | |
| 6,848,983 B2 * | 2/2005 | Gallegos et al. | 451/319 |
| 7,125,327 B2 * | 10/2006 | Wu | 451/490 |
| 2011/0217912 A1 * | 9/2011 | Dai | 451/555 |

* cited by examiner

*Primary Examiner* — Dung Van Nguyen
(74) *Attorney, Agent, or Firm* — Daniel Kirshner

(57) ABSTRACT

A hand-held tool for resurfacing wiper blades which may be utilized with the wiper blade still installed on a vehicle. The tool includes a case having a rectangular cross section. Enclosed within the case are two resurfacing stones: a first resurfacing stone having a rougher surface and a second polishing stone for applying a final finish to the wiper blade. One or more float springs are situated inside the case and between the resurfacing stones to apply pressure to the stones and to assure that appropriate resurfacing pressure is applied to the wiper blade.

2 Claims, 1 Drawing Sheet

WINDSHIELD WIPER RESURFACING TOOL

CROSS REFERENCE TO RELATED APPLICATION

This application is related to and claims priority and a filing date of the Provisional Application bearing Application No. 61/275,549 and a filing date of Aug. 31, 2009.

FIELD OF THE INVENTION

The present invention is a tool for resurfacing windshield wipers. More specifically, the present invention windshield wiper resurfacing tool includes two wiper resurfacing stones having different resurfacing properties.

BACKGROUND OF THE INVENTION

Windshield wipers are well known and are typically employed on vehicles such as trucks and automobiles to remove water and dirt and grime from the vehicle's windshield. The blades of windshield wipers are usually manufactured from rubber and serve to remove the water or grime from the windshield by wiping the windshield in a squeegee-like motion. Over time, windshield wipers tend to lose their edge and deteriorate and/or become clogged with dirt and grime. This negatively impacts on the effectiveness of the windshield wiper and tends to cause streaking. Once the edges have deteriorated, vehicle owners typically purchase new windshield wipers and install them on their vehicles.

A typical prior art windshield wiper blade WB is shown in cross section in FIG. 2. The wiper includes the wiping edge WE which wiping edge is the sector that wipes across the glass panel of the windshield to remove water. The wiper also includes the attachment member AM which attaches to a wiper arm. Of significance to the present invention is the slot S situated on the prior art wiper blade between the wiping edge and the attachment member. For a windshield wiper to function properly, the blade should lie at a 90° angle to the glass surface being wiped and deterioration of the wiper and dirt and grime thereon impede the ability of the blade to sit at the proper angle.

There are several devices in the prior art that attempt to resolve the issue of deterioration of windshield wipers. As compared to the present invention, the prior art displays several deficiencies. For example, U.S. Pat. No. 5,848,471 entitled Windshield Wiper Reconditioning Device (issued to Freeland on Dec. 15, 1998) discloses a device that slices material from the tip of the windshield wiper. Another example is U.S. Pat. No. 6,322,266 B1 entitled Hand-Held Device for Cleaning a Windshield Wiper Blade (issued to Traynor on Nov. 27, 2001) which discloses a wiper blade cleaner that employs a web of bristles.

None of the prior art addresses the problem of resurfacing wiper blades in the novel approach of the present invention. Specifically, it is an objective of the present invention to provide a simple, hand-held tool for resurfacing wiper blades, without slicing off sections of the blade. Furthermore it is an objective of the present invention to resurface wiper blades without the necessity to remove the wiper blades from the vehicle.

Other objectives, advantages and novel features, and further scope of applicability of the present invention will be set forth in the detailed description to follow, taken in conjunction with the accompanying drawings, will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention is a hand-held tool for resurfacing wiper blades which may be utilized with the wiper blade still installed on a vehicle. The tool includes a case having a rectangular cross section. Enclosed within the case are two resurfacing stones: a first resurfacing stone having a rougher surface and a second polishing stone for applying a final finish to the wiper blade. One or more float springs are situated inside the case and between the resurfacing stones to apply pressure to the stones and to assure that appropriate resurfacing pressure is applied to the wiper blade. Two wiper insertion slots are located on the top and bottom of the case. The wiper insertion slots interact with the slot on the wiper blade thereby positioning the blade properly into the tool for refinishing. A user first inserts a wiper blade into the wiper insertions slot corresponding to the rougher surface refinishing stone, and pulls the blade through thereby removing most of the dirt and grime from the blade and applying an initial surface. Next, the user does the same with the second insertion slot corresponding to the polishing stone, thereby completing the process.

BRIEF DESCRIPTION OF THE FIGURES

For a better understanding of the present invention, reference is made to the following description of an exemplary embodiment thereof, considered in conjunction with the accompanying drawings, in which.

DETAILED DESCRIPTION OF THE INVENTION

Figure 1:
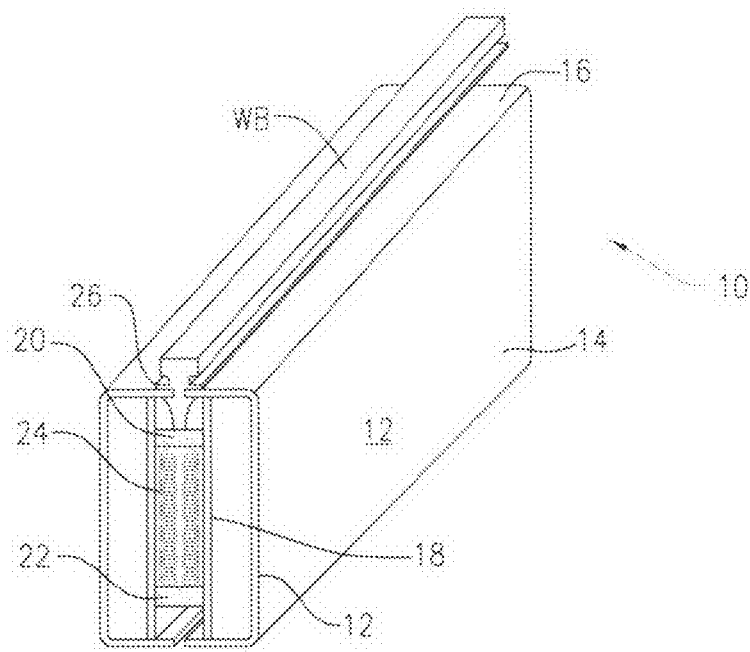
FIG. 1 is a vertical cross-sectional view of the present invention.

The present invention is a tool for resurfacing windshield wipers. The windshield wiper resurfacing tool of the present invention is a hand-hand device that can be employed with the windshield wiper still on installed onto a vehicle, i.e. the wiper does not need to be removed from the vehicle in order to employ the present invention.

Looking now at the Figures, the windshield wiper resurfacing tool of the present invention is designated generally as 10. The tool is enclosed in a case 12 formed from rigid material such as molded or extruded plastic or aluminum. In the embodiment shown here, the case is generally rectangular in its vertical cross-sectional configuration although it need not be, and has side walls 14 and top and bottom walls 16. Inside the case are situated two support walls 18 that extend from the bottom wall to the top wall and are parallel to the side walls. Although the dimensions of the case are not critical for the proper function of the present invention, as shown in the preferred embodiment the case has approximate dimensions of about 1" by 1.5" by 3.5".

Between the two support walls are located a first resurfacing stone 20 and a second resurfacing stone 22. The first resurfacing stone is a grinding stone and has a relatively rough surface for performing an initial resurfacing of a wiper blade. The second resurfacing stone has a smoother surface as compared to the first resurfacing stone and acts as a polishing stone for polishing the wiper blade. In other words, the first resurfacing stone is employed first to apply an initial surface to the wiper blade and thereafter the blade is polished utilizing the second polishing stone.

Between the first and the second resurfacing stones are situated one or more resilient members in the nature of the float springs 24. The float spring (or multiple springs) applies force to the two resurfacing stones to keep tension on them and to thereby apply the desired pressure to the wiper blade when it is being resurfaced. The resilient member is, preferably, a spring (e.g, a float spring) but can be any other mechanical assembly for providing resistance.

Figure 2:
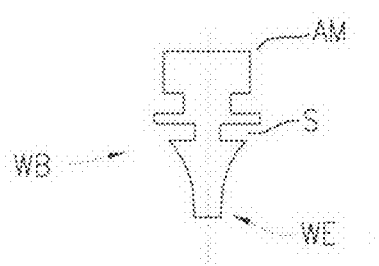
FIG. 2 is a cross-sectional view of a prior art windshield wiper blade.

Now, looking again and more closely at the case 12 of the present invention, there is a windshield wiper insertion slot 26 on each of the top and bottom of the device. As can be seen the Figures, the windshield wiper to be resurfaced is inserted into either of the two slots and thereby makes contact with one of the two resurfacing stones. Specifically, the wiper blade WB is inserted into a slot with the wiping edge of the blade WE inserted inside of the case and the attachment member AM of the blade outside of the case. As such, the slot S of the wiper blade is engaged with the wiper insertion slot 26 of the resurfacing tool. Proper engagement of the wiper blade WB into an insertion slot 26 can see viewed in FIG. 2. It will be thus understood that the two wiper insertion slots should be sized and configured to engage with the slot of a typical prior art windshield wiper blade. The wiper insertion slots therefore serve to guide the blade through the case keeping the blade at the proper 90° angle to either of the two resurfacing stones. In addition, the wiper insertion slots retain the inserted wiper blade at the appropriate distance from one of the two resurfacing stones thereby assuring that the blade makes proper contact and applies appropriate resurfacing pressure on a resurfacing stone.

An end cap that guides the wiper blade into the channel is attached at one end of the case. The end cap also includes a wiper insertion slot which slot is aligned with the wiper insertion slot 26 on the case. Preferably, the wiper insertion slots may be marked "rough" and "fine" which demarcations denote and correspond to the two surfacing stones.

To utilize the present invention windshield wiper resurfacing tool, the windshield wiper blade is lifted away from the glass plate of the windshield wiper. It is noted that an advantage of the present invention is that there is no necessity to remove the wiper blade from the vehicle's wiper arm or from the vehicle. Instead, the wiper blade can be resurfaced while the wiper blade remains affixed to the vehicle. Now, the user first inserts the wiper blade into the wiper insertion slot corresponding to the rougher resurfacing stone. It is disclosed that the wiper blade is inserted into the wiper insertion slot with the slot S of the wiper blade engaged with the lip of the case. The blade is pulled through the wiper insertion slot whereby the blade makes contact with the rougher resurfacing stone. Thus, the large defects and dirt and grime on the wiper blade are removed. Thereafter, the wiper blade is inserted into the wiper insertion slot for the fine or polishing stone. Once again, the slot of the blade engages with the wiper insertion slot of the case, and once again the wiper blade is pulled through. Now, the blade makes contact with the polishing stone thereby removing the last of the dirt and grime and applying the final surface to the blade.

The foregoing is considered as illustrative only of the principles and preferred embodiment of the invention. Furthermore, since numerous changes and modifications will readily occur to one skilled in the art, it is not desired to limit the invention to the exact construction, operation and embodiment shown and described, and accordingly all suitable modifications and equivalents may be resorted to, falling within the scope of the invention.

What is claimed:

1. A windshield wiper resurfacing tool for resurfacing a windshield wiper comprising:
    a case, said case having a top and a bottom, said top and said bottom of said case;
    a first windshield wiper insertion slot formed in said top of said case;
    a second windshield wiper insertion slot formed in said bottom of said case;
    a first resurfacing stone contained within said case, said first resurfacing stone have a resurfacing surface of a first predetermined roughness;
    a second resurfacing stone contained within said case, said second resurfacing stone having a resurfacing surface of second predetermined roughness;
    at least one resilient member contained within said case, said at least one resilient member applying pressure to said first and second resurfacing stone.

2. The windshield wiper resurfacing tool of claim 1 wherein is said resilient member is a float spring.

* * * * *